United States Patent [19]

Shepard, Jr.

[11] Patent Number: 4,658,343

[45] Date of Patent: Apr. 14, 1987

[54] FLUORESCENT LAMP DRIVER

[76] Inventor: Francis H. Shepard, Jr., 16 Lee La., Countryside, Summit, N.J. 07901

[21] Appl. No.: 847,748

[22] Filed: Apr. 3, 1986

[51] Int. Cl.[4] ...................... H02M 3/335; H05B 41/36

[52] U.S. Cl. ................................ 363/22; 315/DIG. 2; 315/DIG. 5

[58] Field of Search ........................ 363/22, 23, 24, 25, 363/26, 49, 97; 315/DIG. 2, DIG. 5

[56] References Cited

U.S. PATENT DOCUMENTS 4,127,798 11/1978 Anderson ..................... 315/DIG. 5

OTHER PUBLICATIONS

Build DC/DC Converters That Work, Electronic Design, vol. 23, No. 11, May 24, 1975, pp. 82–86.

*Primary Examiner*—Peter S. Wong

*Assistant Examiner*—Judson H. Jones

*Attorney, Agent, or Firm*—Thomas R. Morrison

[57] ABSTRACT

A fluorescent lamp driver employs a saturable reactor switch for producing a high-frequency, substantially symmetrical drive signal for igniting and driving a fluorescent lamp. The drive signal is applied to the filaments of a fluorescent lamp using a resonant drive circuit whose components are series resonant near the frequency of the substantially symmetrical drive signal. Before ignition, the resonant drive circuit applies substantially the entire drive signal voltage in series with the filaments as well as across the fluorescent lamp. Thus, the filaments are heated to release electrons which ionize the inert gas to initiate a gas discharge in the lamp. The high-frequency drive signal thenceforth maintains the gas discharge without permitting time for the ionized gas to recombine between half cycles of energization.

8 Claims, 6 Drawing Figures

10

FLUORESCENT LAMP DRIVER

BACKGROUND OF THE INVENTION

The present invention relates to electronic devices and, more particularly, to electronic devices for igniting and driving fluorescent lamps.

A conventional fluorescent lamp includes a partially evacuated glass tube containing an inert gas at low pressure with a fluorescent coating on its inner surface, and electrodes at each end. The electrodes are conventionally thermionic filaments which are heated during the starting process to provide a supply of electrons for initiating a gas-discharge current which ionizes the gas in the tube. A ballast reactor is disposed in the supply line to the electrodes. A thermally controlled breaker periodically shorts the filaments whereby the heating current is applied thereto. After a short heating period, the breaker opens. A collapsing magnetic field in the reactor produces a high-voltage spike capable of initiating current flow through the gas between the electrodes. The resulting gas-discharge current flow generates ultra-violet emissions. The ultra-violet emissions stimulate fluorescence in the fluorescent coating on the inside of the tube, thereby producing visible light. The tube is made of a material such as, for example, soda glass, which blocks the transmission of ultra-violet emissions therethrough and prevents possible harm to objects external to the tube.

Once current begins to flow between the electrodes, the resistance therebetween drops to a fraction of its previous value. The ballast reactor limits the current through the tube. The reduced resistance through the tube substantially reduces the voltage drop therethrough and effectively maintains the starting circuit and the filaments deenergized.

When the fluorescent lamp is driven by an AC source operating at, for example, about 60 Hz, current flow through the tube is extinguished each time the source voltage passes through zero. Thus, such a fluorescent lamp is effectively extinguished for a short time and then re-ignited at a frequency of 120 Hz. Residual ionization in the tube permits current to become re-established without requiring the operation of the starting circuit.

Due to the relatively low line frequency at which it operates, the ionization of the gas in the tube tends to decay between its energized periods. A substantial portion of a cycle is required to re-establish current flow through the gas. While awaiting the resumption of current flow, the light output of the lamp is degraded. Furthermore, the ions in the gas are accelerated toward the electrodes during this time and tend to blacken the tube in their vicinity and reduce the life of the filaments. Also, the relatively low frequency of the conventional AC source require a large and expensive ballast inductor.

Battery operation of a fluorescent lamp is a convenient option. One type of conventional battery operation employs a flyback system for producing periodic narrow unipolar pulses which are applied across the electrodes in the lamp. The output of the flyback system, consisting of unidirectional pulses, energizes the lamp for conduction in only a single direction. Such unidirectional conduction is effective for accelerating the ions toward the electrodes and can effectively destroy the electrodes in a short time.

OBJECTS AND SUMMARY OF THE INVENTION

Accordingly, it is an object of the invention to provide a fluorescent lamp driver which overcomes the drawbacks of the prior art.

It is a further object of the invention to provide a fluorescent lamp driver effective for increasing the light output of the fluorescent lamp.

It is a further object of the invention to provide a fluorescent lamp driver effective for increasing the life of the fluorescent lamp.

It is a further object of the invention to provide a battery-driven fluorescent lamp driver which overcomes the drawbacks of the prior art.

It is a still further object of the invention to provide a fluorescent lamp driver using smaller and less expensive components.

Briefly stated, the present invention provides a fluorescent lamp driver employing a saturable reactor switch for producing a high-frequency, substantially symmetrical drive signal for igniting and driving a fluorescent lamp. The drive signal is applied to the filaments of a fluorescent lamp using a resonant drive circuit whose components are series resonant near the frequency of the drive signal. Before ignition, the resonant drive circuit applies substantially the entire drive signal voltage in series with the filaments as well as across the fluorescent lamp. Thus, the filaments are heated to release electrons which ionize the inert gas to initiate a gas discharge in the lamp. The high-frequency drive signal thenceforth maintains the gas discharge without permitting time for the ionized gas to recombine between half cycles of energization.

According to an embodiment of the invention, there is provided a lamp driver for driving a fluorescent lamp comprising, a saturable reactor switch, means in the saturable reactor switch for generating a substantially symmetrical drive signal at a frequency, a series-resonant drive circuit applying the drive signal to the fluorescent lamp, the series-resonant drive circuit including one of an inductor and a capacitor receiving the symmetrical drive signal and connectable in series with a first terminal of one of first and second filaments of the fluorescent lamp, the series-resonant drive circuit including the other of an inductor and a capacitor connectable to second terminals of the first and second filaments of the fluorescent lamp, and a series-resonant frequency of the inductor and capacitor having a relationship to the frequency effective for heating the first and second filaments and applying the drive signal between the first and second filaments during a start of the fluorescent lamp and effective for driving the fluorescent lamp after the start.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
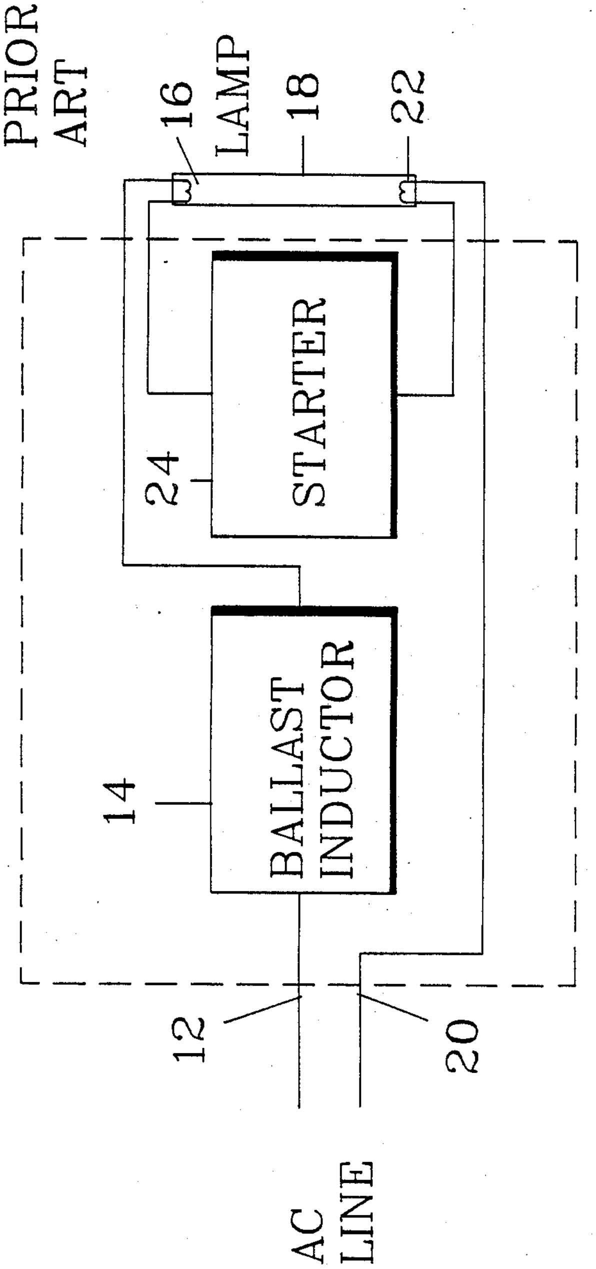
Fig. 1 PRIOR ART
FIG. 1 is a simplified block diagram of a fluorescent lamp and lamp driver according to the prior art.

Referring first to FIG. 1, there is shown generally at 10, a lamp driver according to the prior art. A line 12 of an AC source such as, for example, a 60 Hz, single-phase source is connected in series through a ballast inductor 14 to one terminal of a first filament 16 of a fluorescent lamp 18. A second line 20 of the AC source is connected to one terminal of a second filment 22 of fluorescent lamp 18. The other terminals of filaments 16 and 22 are connected to a conventional starter 24.

When filaments 16 and 22 are considered as electrodes for gas discharge through fluorescent lamp 18, it is seen that starter 24 is effectively in parallel with fluorescent lamp 18. Conversely, when filaments 16 and 22 are considered as thermionic filaments, starter 24 is effectively in series therewith.

Figure 2:
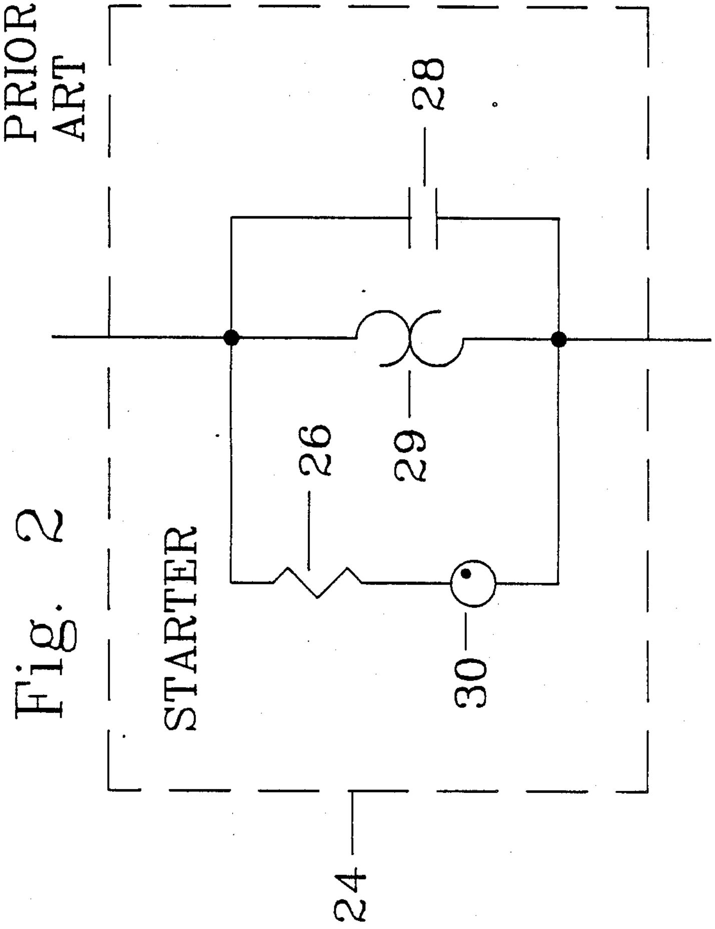
Fig. 2 PRIOR ART
FIG. 2 is a schematic diagram of a starter of the lamp driver of FIG. 1.

Referring now to FIG. 2, starter 24 contains a heater resistor 26 in series with a gas-discharge tube 30 such as, for example, a neon bulb. A normally open thermal switch 29 is connected in parallel with the series combination of heater resistor 26 and gas-discharge tube 30. A capacitor 28 is connected in parallel with thermal switch 29.

With lamp 18 non-conducting, most of the line voltage is applied to starter 24. Such line voltage is sufficient to energize gas-discharge tube 30 and thus pass heating current through heater resistor 26. Heater resistor 26 heats thermal switch 29 until its contacts close. Filament current is thus enabled to pass through thermal switch 29 thereby heating filaments 16 and 22 which release electrons into the inert gas in lamp 18 whereby some of the inert gas is ionized. Heater resistor 26 cools and soon the contacts of thermal switch open. The rapid cutoff of current through ballast inductor 14 applies a voltage spike between electrodes 16 and 22 which initiates a gas discharge within lamp 18.

As soon as a gas discharge is begun in fluorescent lamp 18, the internal resistance in fluorescent lamp 18 falls to a low value. A voltage drop across ballast inductor 14 becomes large compared to the voltage drop across fluorescent lamp 18 and the voltage across starter 24 becomes too small to ignite gas-discharge tube 30. Thus heater current through heater resistor 26 is cut off and starter 24 is effectively removed from the circuit.

Referring now specifically to FIG. 1, due to the relatively low line frequency, ballast inductor 14 requires a large inductance attainable only in a large and expensive component. In addition, the gas discharge in fluorescent lamp 18 is extinguished each half cycle of the line frequency for a time long enough to permit a substantial decay in the ionization of the gas therein. Thus, a delay is experienced in resuming gas discharge following each extinguishment. Thus, a substantial portion of each half cycle may elapse in which gas discharge and light production are absent. As a result, the light output of fluorescent lamp 18 is degraded. Also, during the delay, filaments 16 and 22 are bombarded with ions and so experience reduced lifetimes. Ion bombardment of filaments 16 and 22 blackens the inside of the glass tube and further degrades light output. When fluorescent lamp 18 becomes old, the ionization delay may grow to a value which permits starter 24 to operate in parallel therewith. The resulting current through starter 24 tends to maintain filaments 16 and 22 in the heated condition at all times and further reduces their lifetimes.

Figure 3:
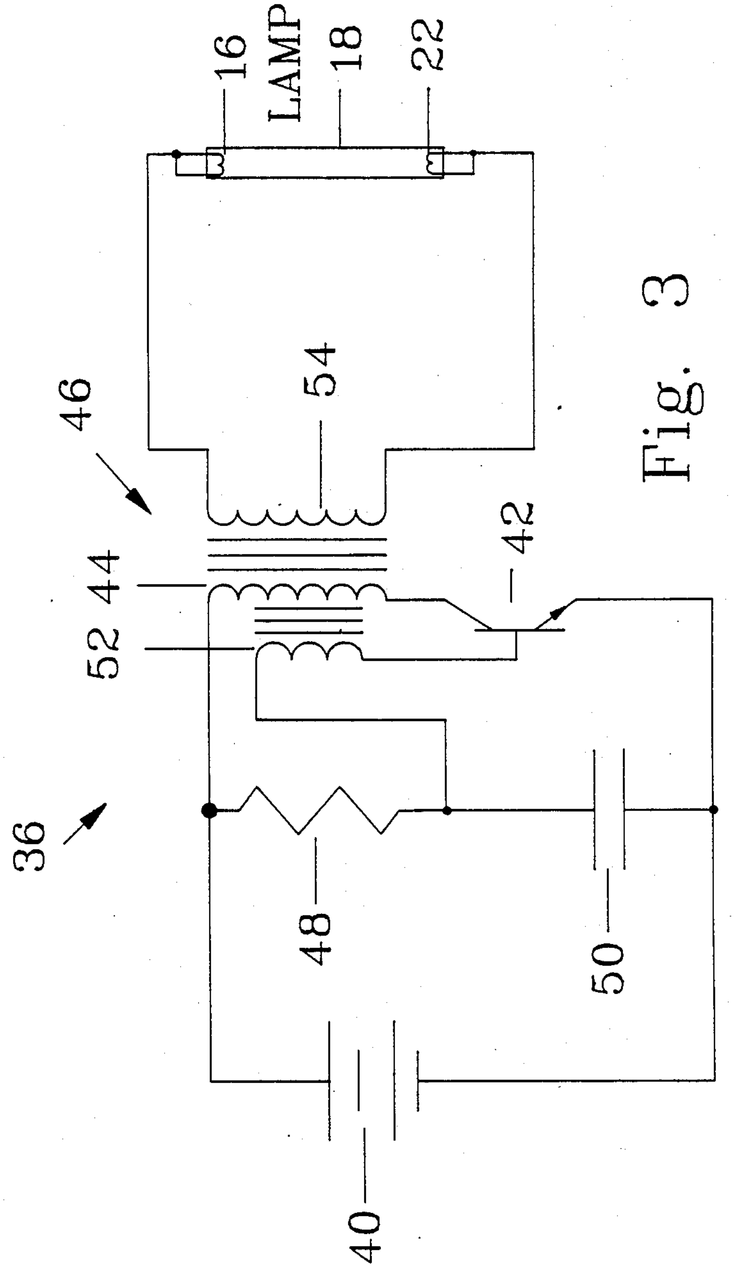
Fig. 3 PRIOR ART
FIG. 3 is a schematic diagram of a fluorescent lamp and a flyback-type lamp driver according to the prior art.

Referring now to FIG. 3, there is shown, generally at 26, a lamp driver 38 of the flyback type, conventionally employed for driving a fluorescent lamp 18 from a battery 40. A collector of a transistor 42 is coupled to one end of a winding 44 of a three-winding transformer 46, the other end of which is connected to the positive terminal of battery 40. The emitter of transistor 42 is connected to the negative terminal of battery 40. A resistor 48 and a capacitor 50 are connected in series across the positive and negative terminals of battery 40. A tickler winding 52 of three-winding transformer 46 is connected from the junction of resistor 48 and capacitor 50 to the base of transistor 42. A secondary winding 54 of three-winding transformer 46 is connected between filaments 16 and 22 of fluorescent lamp 18. The core of three-winding transformer 46 is magnetically saturable.

In operation, when a current is started through transistor 42, a voltage fed back from winding 44 to tickler winding 52 produces an increasing current through transistor 42 until the core of three-winding transformer 46 becomes saturated. Since the saturated core of three-winding transformer 46 is no longer capable of supplying an increasing voltage to tickler winding 52, current in transistor 42 is cut off almost instantly. This causes the magnetic field in three-winding transformer 46 to collapse and induces a large voltage spike in secondary winding 54 which, when applied across fluorescent lap 18, produces a gas discharge therein and the production of light thereform. The process repeats at a frequency of several thousand Hz to produce substantially flicker-free light.

This prior-art device suffers from the fact that the duty ratio, or ratio of time on to time off, is much less than one. Thus the phosphor in fluorescent lamp 18 is stimulated into light emission for a correspondingly short time in each cycle. In addition, the voltage spikes applied to fluorescent lamp 18 are of very high voltage and are essentially unipolar, and thus tend to accelerate ions to high velocity for impact on filaments 16 and 22. As a result, a rapid blackening of the envelope is experienced in the vicinity of filaments 16 and 22 and the lives of these elements are substantially shortened.

Figure 4:
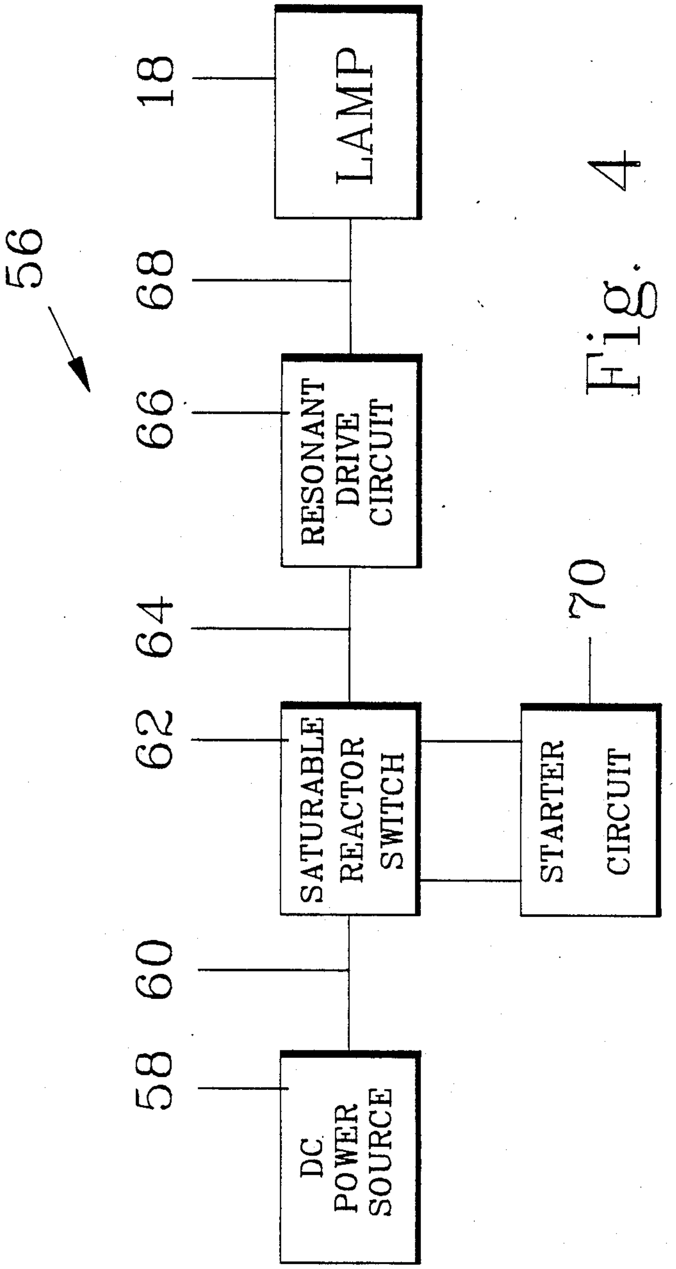
FIG. 4 is a block diagram of a fluorescent lamp and lamp driver according to an embodiment of the invention.

Referring now to FIG. 4, there is shown, generally at 56, a simplified block diagram of a lamp driver according to an embodiment of the invention. A DC power source 58 which may be, for example, a battery or an AC-to-DC converter, applies a DC voltage on a line 60 to a saturable reactor switch 62. Saturable reactor switch 62 applies a symmetrical square-wave signal on a line 64 to a resonant drive circuit 66. Resonant drive circuit 66 in turn produces a sine-wave signal for application on a line 68 to fluorescent lamp 18. A starter circuit 70 is provided for initiating the switching in saturable reactor switch 62.

DC power source 58 is conventional and thus is not further detailed. The remainder of lamp driver 56 is described below.

Figure 5:
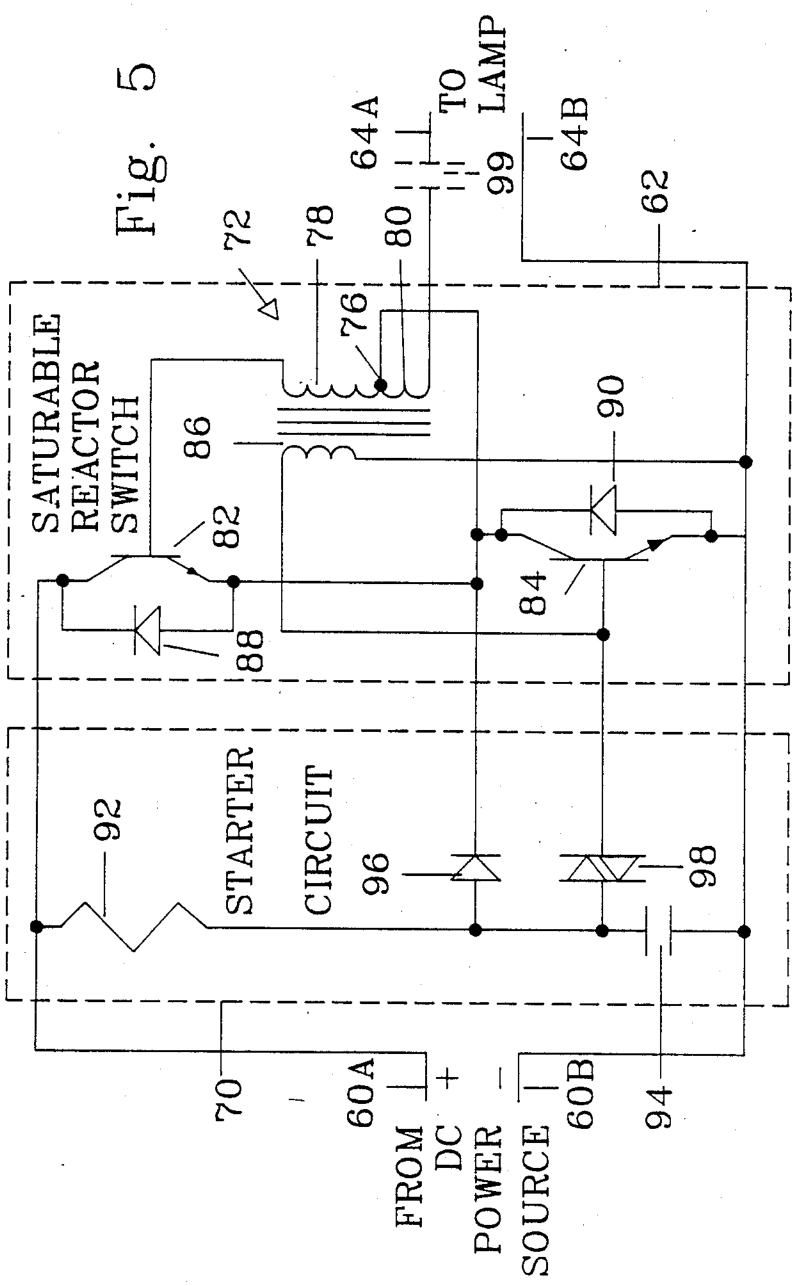
FIG. 5 is a schematic diagram of a saturable reactor switch and starter circuit of the lamp driver circuit of FIG. 4.

Referring now to FIG. 5, saturable reactor switch 62 is similar to a switch disclosed in my prior U.S. Pat. No. 4,509,004 and its divisional application Ser. No. 713,762, the disclosures of which are herein incorporated by reference, wherein a saturable-reactor switch is used as a pulse generator in a motor-control system. Saturable reactor switch 62 includes a saturable transformer 72 having a tapped winding 74 divided by a tap 76 into a large winding 78 and a small winding 80. The collector of transistor 82 is connected to line 60A, its base is connected to the terminal of large winding 78, and its emitter connected to tap 76. The collector of a second transistor 84 is connected to tap 76, its emitter is connected to ground, and its base is connected to one terminal of a tickler winding 86 of saturable transformer 72. The other end of tickler winding 86 is connected to ground. A diode 88 is connected between the collector and emitter of transistor 82. A diode 90 is connected between the collector and emitter of transistor 84.

Starter circuit 70 includes a charging resistor 92 and a capacitor 94 connected in series between lines 60A and 60B. A diode 96 is connected from the junction of charging resistor 92 and capacitor 94 to the collector of transistor 84. A breakdown diode 98 is connected from the junction of charging resistor 92 and capacitor 94 to the base of transistor 84.

In operation, when power is first applied to lines 60A and 60B, capacitor 94, and the load capacitance (not shown) connected to line 64A and 64B, begin charging through charging resistor 92. The base of transistor 84 remains cut off by breakdown diode 98 until the voltage in capacitor 94 reaches the breakdown value of breakdown diode 98. At that time, breakdown diode 98 suddenly conducts to apply a current pulse to the base of transistor 84. This current pulse at the base of transistor 84 forces it into conduction. Transistor 84 begins discharging the energy stored in the load capacitance through small winding 80. The current in small winding 80 induces a negative voltage in large winding 78 for application to the base of transistor 82 thus maintaining it in the cutoff condition. The current in small winding 80 induces a positive voltage in tickler winding 86 for application to the base of transistor 84, thus maintaining this transistor in the conducting condition.

This condition continues until the core of small winding 80 saturates. At that time, a negative voltage is applied by tickler winding 86 to the base of transistor 84 thus cutting it off, and a positive voltage is applied by tapped winding 74 to the base of transistor 82, thus turning it on. Positive voltage from line 60A flows through transistor 82 and small winding 80 to the load. The conducting condition of transistor 82 is maintained by a positive voltage induced in large winding 78 due to the current in small winding 80. Transistor 82 continues to conduct until the core of small winding 80 is driven in saturation in the opposite sense from that which existed in the previous half cycle. When small winding 80 saturates, transistor 82 is cut off and transistor 84 is turned on. The above operation then repeats with conduction alternating between transistor 82 and transistor 84. Diodes 88 and 90 reduce the reverse voltage on their transistors. Once switching is started, starter circuit 70 serves no further function. Diode 96 prevents capacitor 94 from being charged through charging resistor 92.

The switching frequency of saturable reactor switch 62 depends on the material from which the core of saturable transformer 72 is made, the number of turns therein, and on the base-emitter clamp voltage of transistors 82 and 84. A high frequency is desirable for flicker reduction and for insuring that the ionized gas in fluorescent lamp 18 does not have time to recombine. When ionization is maintained, filaments 16 and 22 are not subjected to ion bombardment as occurs at lower frequencies. In addition, higher frequencies permit the use of smaller inductive components. The maximum usable frequency is limited by the switching abilities of transistors 82 and 84. The minimum usable frequency is that at which ionization is maintained and flicker is avoided. A minimum frequency of several hundred Hz satisfies this requirement. The frequency is most preferably above the frequency range to which human ears are sensitive in order to avoid the possibility of audible buzzing. The normal human audible range ends between about 10 and 20 KHz. Thus a frequency in excess of 10 KHz is preferred, with a frequency in excess of 20 KHz being more preferred. The most preferred frequency is from about 25 to about 55 KHz.

It will be clear to one skilled in the art that, since each half cycle of conduction continues for the time it takes to drive the core of small winding 80 from saturation in one direction to saturation in the other direction, positive and negative alternations of the signal at the output of saturable reacotr switch 62 are of substantially equal length. The substantially equal positive and negative alternations eliminate the problem of a DC component in the prior-art device shown in FIG. 3.

An AC coupling capacitor 99 may optionally be provided in one or both of lines 64A and 64B for blocking the application of DC to ensuing circuits. The lamp driver appears to operate effectively with or without AC coupling capacitor 99. The presence of AC coupling capacitor 99 may improve the life of fluorescent lamp 18 by reducing any DC component applied thereto.

Figure 6:
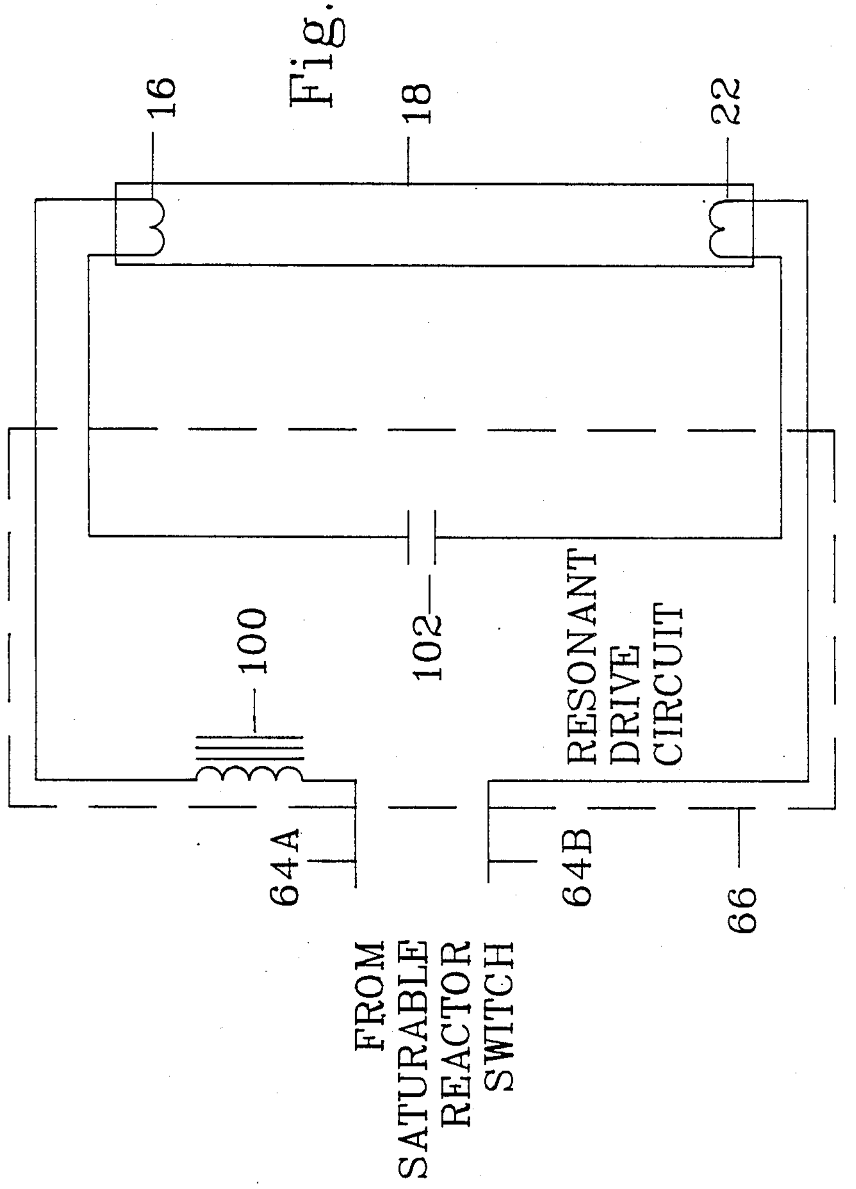
FIG. 6 is a schematic diagram of a fluorescent lamp and a resonant drive circuit of FIG. 4.

Referring now to FIG. 6, resonant drive circuit 66 includes a series-resonant circuit consisting of an inductor 100 and a capacitor 102. Inductor 100 is connected between line 64A and a first terminal of filament 16. Capacitor 102 is connected between a second terminal of filament 16 and a first terminal of filament 22. A second terminal of filament 22 is connected to line 64B.

As is well known, a series-resonant circuit theoretically presents a zero impedance to a signal at its resonant frequency. Thus, before a gas discharge is started in fluorescent lamp 18, if the frequency of the signal on line 64 is equal to the series-resonant frequency of resonant drive circuit 66, and ignoring internal resistances in resonant drive circuit 66, the only impedance seen looking into resonant drive circuit 66 is the combined resistances of filaments 16 and 22. As a consequence, virtually the entire signal voltage on line 64 appears in series across filaments 16 and 22 resulting in heating thereof. Also, although the impedance of a perfect series-resonant circuit is zero, this occurs due to the equal and opposite phases of the signals across these elements. The amplitude of the signal across either of the elements, however, is equal to the source signal, and differs from the source signal only in its phase. Thus, besides heating filaments 16 and 22, line 60 also applies substantially the entire signal voltage between filaments 16 and 22, thereby encouraging the initiation of a gas discharge in fluorescent lamp 18. Once the gas discharge has begun, the internal resistance of fluorescent lamp 18 drops to a low value as previously described, with the current therethrough limited by inductor 100. Due to the high switching frequency employed, inductor 100 may be relatively small and inexpensive compared to the massive ballast inductors required at conventional line frequencies.

I have discovered that the apparatus of the invention is relatively insensitive to an exact match between the switching frequency and the series-resonant frequency of line 60. Although I do not intend to be bound by any particular theory, it appears that the switching frequency of saturable reactor switch 62 is pulled by interaction with resonant drive circuit 66 to a value which is successful in initiating a gas discharge. This may be due to the fact that resonant drive circuit 66 contains a substantial part of the laod capacitance which is charged and discharged by saturable reactor switch 62 in driving the core of saturable transformer 72 from saturation in one direction to saturation in the other direction. Thus, changing the values in resonant drive circuit 66 changes the charge and discharge rates thereof and correspondingly changes the time required to drive the core of saturable transformer 72 between its two saturated conditions. Also, the locations of inductor 100 and capacitor 102 may be interchanged in resonant drive circuit 66 without departing from the spirit and scope of the invention.

The apparatus of the present invention is fully capable of igniting and driving more than one lamp 18. Each additional lamp 18 requires a corresponding resonant drive circuit 66 for developing the starting voltage across its lamp 18.

In some types of lamps 18, sufficient gas ionization can be achieved in the vicinity of filaments 16 and 22 for initiating a gas discharge without applying heating current to the filaments. Although I do not intend to be bound by any particular theory to explain such action, it is possible that field-effect emission may liberate sufficient electrons to achieve partial gas ionization. The Q of a resonant circuit is reduced by the resistance in the resonant circuit. The voltage which is applied across lamp 18 is proportional to the Q of the resonant circuit. I have discovered that satisfactory starting and driving may be achieved when the two terminals of filament 16 are short circuited and when the two terminals of filament 22 are similarly short circuited. I believe that the removal of the resistance provided by short-circuiting filaments 16 and 22 permits extremely high AC voltages to be developed across lamp 18. This may account for the rapid starting I achieve with the disclosed circuit.

Although the foregoing description is directed toward a driver for a fluorescent lamp, it should be clear to one skilled in the art that certain types of gas discharge devices which do not employ a fluorescent material therein may also be driven by the lamp driver of the present invention. For example, gas-discharge tubes made of material transparent to ultra-violet light, and without fluorescent material, are employed as ultraviolet sources. In all other respects such devices are identical to a fluorescent lamp and may be ignited and driven by the apparatus of the present invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A lamp driver for driving a fluorescent lamp comprising:

a saturable reactor switch;

means in said saturable reactor switch for generating a substantially symmetrical drive signal at a frequency;

a series-resonant drive circuit applying said drive signal to said fluorescent lamp;

said series-resonant drive circuit including one of an inductor and a capacitor receiving said drive signal and connectable in series with a first terminal of one of first and second filaments of said fluorescent lamp;

said series-resonant drive circuit including the other of an inductor and a capacitor connectable to second terminals of said first and second filaments of said fluorescent lamp;

a series-resonant frequency of said inductor and capacitor having a relationship to said frequency effective for heating said first and second filaments and applying said drive signal between said first and second filaments during a start of said fluorescent lamp and effective for driving said fluorescent lamp after said start;

said saturable reactor switch including a saturable transformer having a small winding and a large winding separated by a tap;

said small winding being connected to carry substantially all of a load current from said tap to said series-resonant drive circuit; and means for employing a current induced in said large winding from said load current in said small winding for controlling an On condition of said saturable reactor switch.

2. A lamp driver for driving a fluorescent lamp comprising:

a saturable reactor switch;

means in said saturable reactor switch for generating a substantially symmetrical drive signal at a frequency;

a series-resonant drive circuit applying said drive signal to said fluorescent lamp;

said series-resonant drive circuit including one of an inductor and a capacitor receiving said drive signal and connectable in series with a first terminal of said fluorescent lamp;

said series-resonant drive circuit including the other of an inductor and a capacitor connectable to a second terminal of said fluorescent lamp;

a series-resonant frequency of said inductor and capacitor having a relationship to said frequency effective for starting said fluorescent lamp and for driving said fluorescent lamp after said start;

said means for generating a drive signal including:

a saturable transformer having a tapped winding and a tickler winding;

said tapped winding being divided by a tap into a first winding and a second winding;

a first transistor having a collector-emitter path connected from said tap to a first DC voltage;

said tickler transformer being connected to a base of said first transistor;

a second transistor having a collector-emitter path connected from a second DC voltage to said tap;

a terminal of said first winding remote from said tap being connected to a base of said second transistor;

a terminal of said second winding remote from said tap being connected to said series-resonant drive circuit; and said first, second and tickler windings being polled such that a drive signal in one direction is effective for turning on one of said first and second transistors and for turning off the other thereof and a drive signal in the other direction is effective for turning off said one of said first and second transistors and turning on the other thereof.

3. A drive circuit according to claim 2 wherein a number of turns in at least said second winding is effective for driving a core of said second winding between saturation in said first and second magnetic polarities at a rate effective for producing said frequency.

4. A drive circuit according to claim 2 further comprising a first diode between said emitter and collector of said first transistor and a second diode between said emitter and collector of said second transistor.

5. A drive circuit according to claim 2, further comprising a starter circuit, said starter circuit including:

a charging resistor and a capacitor in series between said first and second DC voltages;

a diode connected between a junction of said charging resistor and said capacitor and one of said collector and emitter of said first transistor;

a breakdown diode connected between said junction and said base of said first transistor; and a breakdown voltage of said breakdown voltage being substantially less than a voltage difference between said first and second DC voltages whereby, during starting, said first transistor initially is maintained in the off condition by said breakdown diode while said capacitor is charged and then is turned on when a voltage in said capacitor reaches a breakdown voltage of said breakdown diode whereby a charge stored in said capacitor is fed to said lamp through said second winding.

6. A drive circuit according to claim 1 wherein said frequency exceeds about 10 KHz.

7. A drive circuit according to claim 6 wherein said frequency is from about 10 to about 55 KHz.

8. A lamp driver for driving a fluorescent lamp comprising:

a saturable reactor switch;

means in said saturable reactor switch for generating a substantially symmetrical drive signal at a frequency;

said fluorescent lamp having first and second terminals spaced apart therein:

a series-resonant drive circuit applying said drive signal to said first and second terminals;

said series-resonant drive circuit including one of an inductor and a capacitor receiving said drive signal and connectable to said first terminal;

said series-resonant drive circuit including the other of an inductor and a capacitor connectable to said second terminal;

a series-resonant frequency of said inductor and capacitor having a relationship to said frequency effective for applying said drive signal between said first and second terminals during a start of said fluorescent lamp and effective for driving said fluorescent lamp after said start;

said saturable reactor switch including a saturable transformer having a small winding and a large winding separated by a tap;

said small winding being connected to carry substantially all of a load current from said tap to said series-resonant drive circuit; and means for employing a current induced in said large winding from said load current in said small winding for controlling on ON condition of said saturable reactor switch.

* * * * *